(12) United States Patent
Subramaniyan et al.

(10) Patent No.: US 9,747,683 B2
(45) Date of Patent: Aug. 29, 2017

(54) METHODS AND SYSTEMS FOR DETECTING COMPONENT WEAR

(71) Applicant: General Electric Company, Schenectady, NY (US)

(72) Inventors: Arun Karthi Subramaniyan, Clifton Park, NY (US); Khan Mohamed Khirullah Genghis Khan, Niskayuna, NY (US); Clifford Bueno, Halfmoon, NY (US); Ali Can, Niskayuna, NY (US); Adrian Gabriel Loghin, Rexford, NY (US); Jie Yu, Santa Clara, CA (US)

(73) Assignee: General Electric Company, Niskayuna, NY (US)

( * ) Notice: Subject to any disclaimer, the term of this patent is extended or adjusted under 35 U.S.C. 154(b) by 111 days.

(21) Appl. No.: 14/977,253

(22) Filed: Dec. 21, 2015

(65) Prior Publication Data

US 2017/0178308 A1    Jun. 22, 2017

(51) Int. Cl.
*G06T 7/00* (2017.01)
*G06F 17/50* (2006.01)
(Continued)

(52) U.S. Cl.
CPC .......... *G06T 7/001* (2013.01); *G06F 17/5009* (2013.01); *G06K 9/00208* (2013.01); *G06K 9/46* (2013.01); *G06K 9/6212* (2013.01); *G06K 9/6214* (2013.01); *G06T 5/50* (2013.01); *G06T 7/0081* (2013.01); *G06T 2207/10016* (2013.01); *G06T 2207/10081* (2013.01); *G06T 2207/30164* (2013.01)

(58) Field of Classification Search
CPC combination set(s) only.
See application file for complete search history.

(56) References Cited

U.S. PATENT DOCUMENTS 5,311,128 A    5/1994 Lareau et al.
6,701,615 B2   3/2004 Harding et al.
(Continued)

OTHER PUBLICATIONS

Deng, Yiming et al.; Characterization of Magneto-Optic Imaging Data for Aircraft Inspection; IEEE Transactions on Magnetics; Oct. 2006; vol. 42 No. 10; pp. 3228-3230.
(Continued)

*Primary Examiner* — Anand Bhatnagar
(74) *Attorney, Agent, or Firm* — Nitin N. Joshi

(57) ABSTRACT

A monitoring system for determining component wear is provided. The monitoring system includes a memory device configured to store a reference model of a component and a component wear monitoring (CWM) device configured to receive a component image of a first component being inspected, detect a plurality of manmade structural features in the received component image, adjust the component image to mask out at least some of the plurality of manmade structural features from the received component image, compare the adjusted component image with the reference model to determine one or more potential defect areas in the first component, analyze each of the one or more defect areas to determine a state of the potential defect areas, and output the state of the one or more potential defect areas to a user.

24 Claims, 5 Drawing Sheets

(51) Int. Cl.
*G06K 9/46* (2006.01)
*G06K 9/62* (2006.01)
*G06K 9/00* (2006.01)
*G06T 5/50* (2006.01)

(56) References Cited

U.S. PATENT DOCUMENTS

| | | | | |
|---|---|---|---|---|
| 6,933,718 B2 * | 8/2005 | Collingwood | ........... | G01B 7/28 |
| | | | | 324/225 |
| 6,970,578 B1 * | 11/2005 | Strand | ................ | G06K 9/00637 |
| | | | | 348/81 |
| 7,218,706 B2 | 5/2007 | Hopkins et al. | | |
| 7,221,445 B2 | 5/2007 | Earthman et al. | | |
| 7,646,908 B2 * | 1/2010 | Onishi | .................... | G06T 7/001 |
| | | | | 382/149 |
| 7,925,452 B2 * | 4/2011 | Safai | ...................... | G01N 17/00 |
| | | | | 702/34 |
| 8,494,810 B2 * | 7/2013 | Goldfine | ................. | G07C 3/00 |
| | | | | 702/183 |
| 8,779,943 B2 * | 7/2014 | Wolcken | ................ | B64D 45/00 |
| | | | | 340/945 |
| 8,866,891 B2 * | 10/2014 | Derrien | .............. | G01N 21/9515 |
| | | | | 348/50 |
| 8,958,946 B2 * | 2/2015 | Nicq | ........................ | G01N 3/30 |
| | | | | 701/34.4 |
| 9,546,004 B1 * | 1/2017 | Safai | ...................... | B64D 45/00 |
| 2004/0126909 A1 * | 7/2004 | Obara | .................. | G06T 7/0004 |
| | | | | 438/14 |
| 2006/0159330 A1 * | 7/2006 | Sakai | ...................... | G06T 7/001 |
| | | | | 382/141 |
| 2009/0148031 A1 * | 6/2009 | Fukami | ................ | G01N 21/954 |
| | | | | 382/141 |
| 2009/0309762 A1 * | 12/2009 | Wolcken | ............... | B64D 45/00 |
| | | | | 340/945 |
| 2012/0236318 A1 * | 9/2012 | Aoki | .................... | G01B 11/245 |
| | | | | 356/613 |
| 2015/0226013 A1 * | 8/2015 | Kirkhope | ................. | G01N 3/56 |
| | | | | 702/6 |

OTHER PUBLICATIONS

Jun, Jongwoo et al.; A Hand Held Magnetic Camera System for Real Time Crack Inspection; Sensors Applications Symposium (SAS) 2011 IEEE; San Antonio, TX; Feb. 22-24, 2011; 4 pp.

* cited by examiner

METHODS AND SYSTEMS FOR DETECTING COMPONENT WEAR

BACKGROUND

The field relates generally to detecting component wear, and more specifically, to methods and systems for detecting sub-surface features in a component that may indicate a decrease in service life of the component.

Structural decline in industrial components manifests itself both on the surface as well as below the surface. Proper inspection is required to accurately identify features indicating decline, e.g., decline resulting from corrosion and cracking. Visual inspections can be misleading and often provide only qualitative measures of decline by detecting surface issues. Detecting and quantifying decline or defects in industrial equipment can be challenging. While systems exist to scan for subsurface defects, i.e., computer tomography (CT) and X-rays, variations in different parts of the same type can cause accuracy problems. In addition some systems mischaracterize certain manmade features as corrosion or defects. Accurately detecting and quantifying decline features is critical to accurately modeling and predicting the life of industrial components.

BRIEF DESCRIPTION

In one aspect, a monitoring system for determining component wear is provided. The monitoring system includes a memory device configured to store a reference model of a component and a component wear monitoring ("CWM") device in communication with the memory device. The CWM device configured to receive a component image of a first component being inspected, detect a plurality of manmade structural features in the received component image, adjust the component image to mask out at least some of the plurality of manmade structural features from the received component image, compare the adjusted component image with the reference model to determine one or more potential defect areas in the first component, analyze each of the one or more defect areas to determine a state of the potential defect areas, and output the state of the one or more potential defect areas to a user.

In another aspect, a component wear monitoring ("CWM") device is provided. The CWM device includes a processor and at least one memory device. The processor is in communication with the at least one memory device. The CWM device is configured to receive a component image of a first component being inspected, detect a plurality of manmade structural features in the received component image, adjust the component image to mask out at least some of the plurality of manmade structural features from the received component image, and compare the adjusted component image with a reference model to determine one or more potential defect areas in the first component. The reference model is stored in the at least one memory device. The CWM device is also configured to analyze each of the one or more defect areas to determine a state of the potential defect areas, and output the state of the one or more potential defect areas to a user.

In yet another aspect, a method for detecting component wear is provided. The method is implemented using a component wear monitoring ("CWM") device including a processor and at least one memory device. The method includes receiving a component image of a first component being inspected, detecting a plurality of manmade structural features in the received component image, and adjusting the component image to mask out at least some of the plurality of manmade structural features from the received component image. The reference model is stored in the at least one memory device. The method also includes comparing the adjusted component image with the reference model to determine one or more potential defect areas in the first component, analyzing each of the one or more defect areas to determine a state of the potential defect areas, and outputting the state of the one or more potential defect areas to a user.

DRAWINGS

These and other features, aspects, and advantages of the present disclosure will become better understood when the following detailed description is read with reference to the accompanying drawings in which like characters represent like parts throughout the drawings, wherein.

Figure 1:
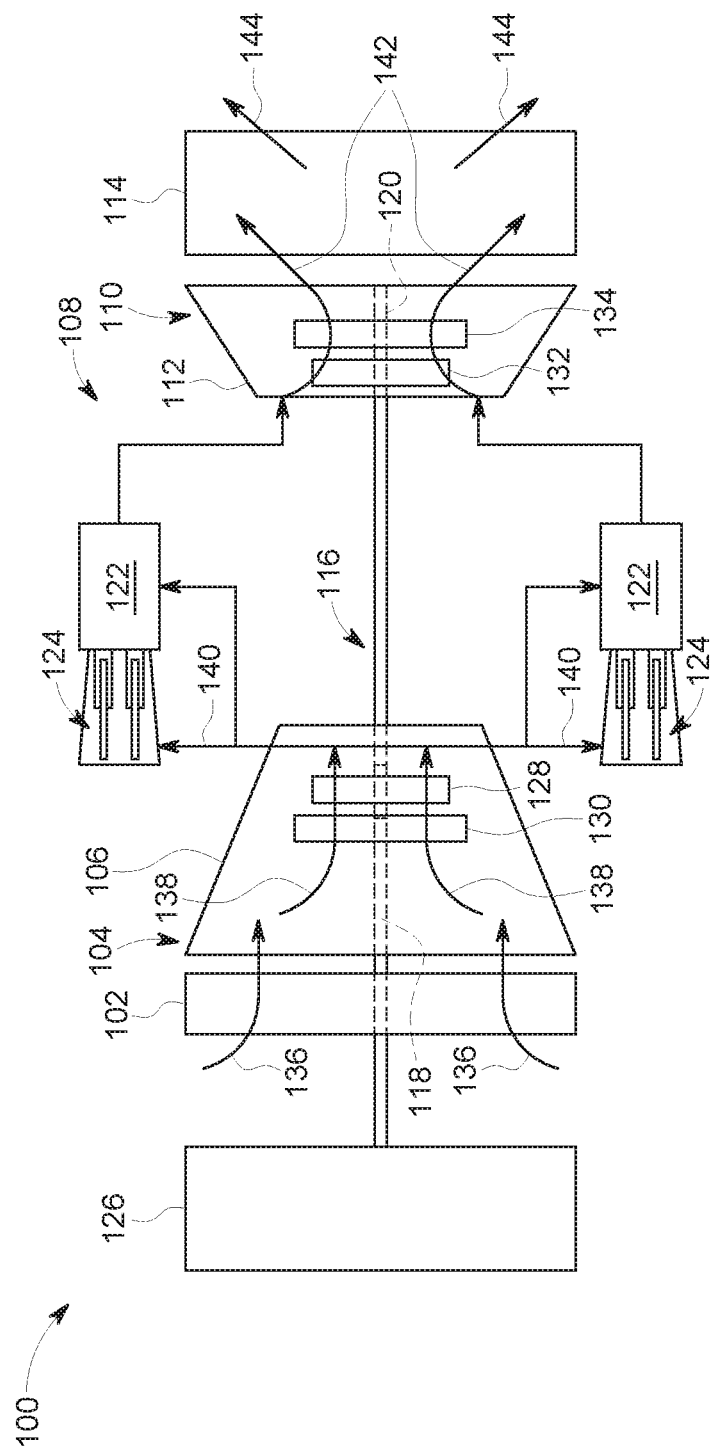
FIG. 1 is a schematic view of an exemplary high-value asset, i.e., a turbomachine, and more specifically, a gas turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The monitoring method and systems described herein provide for enhanced assessment of the wear of components and thus facilitate a more accurate prediction of the lifetime of components. Furthermore, the method and systems described herein allow for an accurate detection of the existence, scope, and location of corrosion and other defects in those components. Also, the system and methods described herein are not limited to any single predefined component, but may be implemented with any component of a device that is subject to wear similar to those described herein. For example, the method and systems described herein may be used with aircraft, wind turbines, locomotives, power systems, automobiles, and other devices having components that are subject to wear. By accurately analyzing the subsurface defects in components, operating lifetimes and maintenance schedules are more accurately generated.

FIG. 1 is a schematic view of an exemplary high-value asset, i.e., a turbomachine, and more specifically, a gas turbine engine 100. Alternatively, any apparatus, system, and facility subject to maintenance and with components subject to wear may be monitored and subject to inspection using a system substantially similar to the measuring system (not shown in FIG. 1) as described herein, including, without limitation, combustion systems such as furnaces, gasification systems, boilers, turbines, geared devices, and high-temperature exhaust systems.

In the exemplary embodiment, gas turbine engine 100 includes an air intake section 102, and a compressor section 104 coupled downstream from, and in flow communication with, intake section 102. Compressor section 104 is enclosed within a compressor casing 106. A combustor section 108 is coupled downstream from, and in flow communication with, compressor section 104, and a turbine section 110 is coupled downstream from, and in flow communication with, combustor section 108. Gas turbine engine 100 is enclosed within a turbine casing 112 and includes an exhaust section 114 downstream from turbine section 110. Moreover, in the exemplary embodiment, turbine section 110 is coupled to compressor section 104 via a rotor assembly 116 that includes, without limitation, a compressor rotor, or drive shaft 118 and a turbine rotor, or drive shaft 120.

In the exemplary embodiment, combustor section 108 includes a plurality of combustor assemblies, i.e., combustors 122 that are each coupled in flow communication with compressor section 104. Combustor section 108 also includes at least one fuel nozzle assembly 124. Each combustor 122 is in flow communication with at least one fuel nozzle assembly 124. Moreover, in the exemplary embodiment, turbine section 110 and compressor section 104 are rotatably coupled to a load 126 via drive shaft 118. For example, load 126 may include, without limitation, an electrical generator or a mechanical drive application, e.g., a pump. Alternatively, gas turbine engine 100 may be an aircraft engine. In the exemplary embodiment, compressor section 104 includes at least one compressor blade assembly 128, i.e., blade 128 and at least one adjacent stationary vane assembly 130. In the exemplary embodiment, compressor blade assembly 128 includes a rotor blade shroud (not shown) at each distal end. Rotor blade shroud also includes a plurality of cooling holes that have been drilled on the shroud. Rotor blade shroud is subject to corrosion and other wear based defects.

Also, in the exemplary embodiment, turbine section 110 includes at least one turbine blade assembly, i.e., bucket 132 and at least one adjacent stationary nozzle assembly 134. Each compressor blade assembly 128 and each turbine bucket 132 are coupled to rotor assembly 116, or, more specifically, compressor drive shaft 118 and turbine drive shaft 120.

In operation, air intake section 102 channels air 136 towards compressor section 104. Compressor section 104 compresses inlet air 136 to higher pressures and temperatures prior to discharging compressed air 138 towards combustor section 108. Compressed air 140 is channeled to fuel nozzle assembly 124, mixed with fuel (not shown), and burned within each combustor 122 to generate combustion gases 142 that are channeled downstream towards turbine section 110. Combustion gases 142 generated within combustors 122 are channeled downstream towards turbine section 110. After impinging turbine bucket 132, thermal energy is converted to mechanical rotational energy that is used to drive rotor assembly 116. Turbine section 110 drives compressor section 104 and load 126 via drive shafts 118 and 120, and exhaust gases 144 are discharged through exhaust section 114 to ambient atmosphere.

Figure 2:
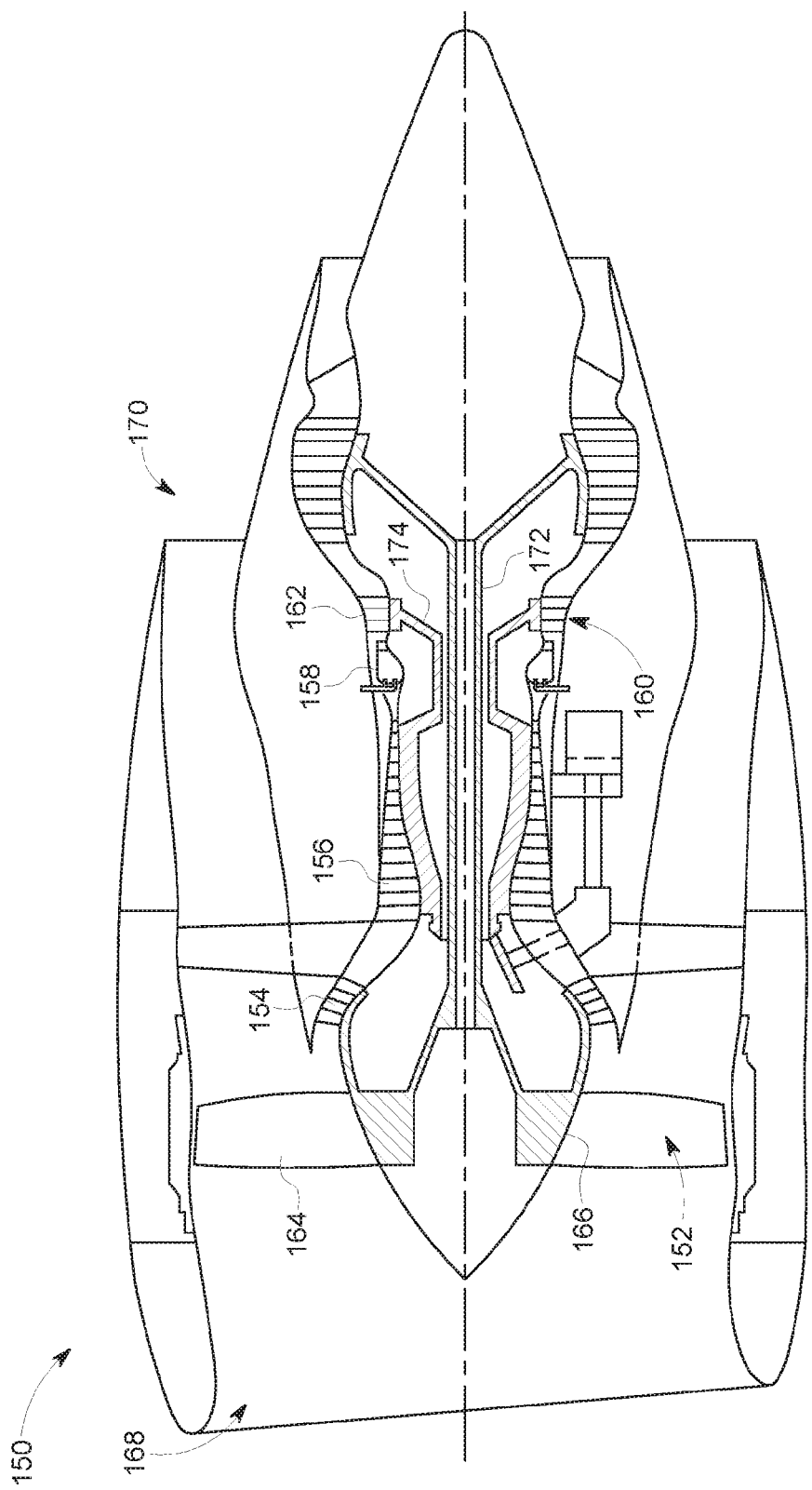
FIG. 2 is a schematic illustration of an exemplary gas turbine engine, and more specifically, a jet turbine engine.

FIG. 2 is a schematic illustration of an exemplary gas turbine engine, and more specifically, a jet turbine engine 150. In the exemplary embodiment, jet turbine engine 150 includes a fan assembly 152, a booster 154, a high pressure compressor 156, and a combustor 158. Jet turbine engine 150 also includes a high pressure turbine 160, and a low pressure turbine 162, all in serial flow arrangement. Fan assembly 152 includes an array of fan blades 164 extending radially outward from a rotor disk 166. Engine 150 also includes an intake side 168 and an exhaust side 170. In the exemplary embodiment, engine 150 is, but is not limited to, a LEAP or P20 gas turbine engine available from General Electric Company, Cincinnati, Ohio. Fan assembly 152, booster 154, and turbine 162 are coupled by a first rotor shaft 172, and the compressor 156 and turbine 160 are coupled by a second rotor shaft 174.

In operation, air flows through fan assembly 152 and compressed air is supplied to high pressure compressor 156 through booster 154. The highly compressed air is delivered to combustor 158, where it is mixed with a fuel and ignited to generate combustion gases. The combustion gases are channeled from combustor 158 to drive turbines 160 and 162. Turbine 162 drives fan assembly 152 and booster 154 by way of shaft 172. Turbine 160 drives compressor 156 by way of shaft 174. In the exemplary embodiment, fan blade 164 includes a fan blade shroud (not shown) at each distal end. Fan blade shroud also includes a plurality of cooling holes that have been drilled on the shroud. Fan blade shroud is subject to corrosion and other wear based defects. In at least one embodiment, the plurality of components includes blade 164.

FIGS. 1 and 2 are described for illustrative purposes to illustrate devices that are subject to maintenance with components that are subject to wear. Turbine engine 100 and jet turbine engine 150 both include a plurality of components that are subject to wear and may require refurbishment and replacement. In the example embodiment turbine engine 100 and jet turbine engine 150 are assets. Each of these assets include a plurality of components, such as rotor blade shroud (not shown) and fan blade shroud (not shown) which are associated with compressor blade 128 and fan blade 164, respectively.

Figure 3:
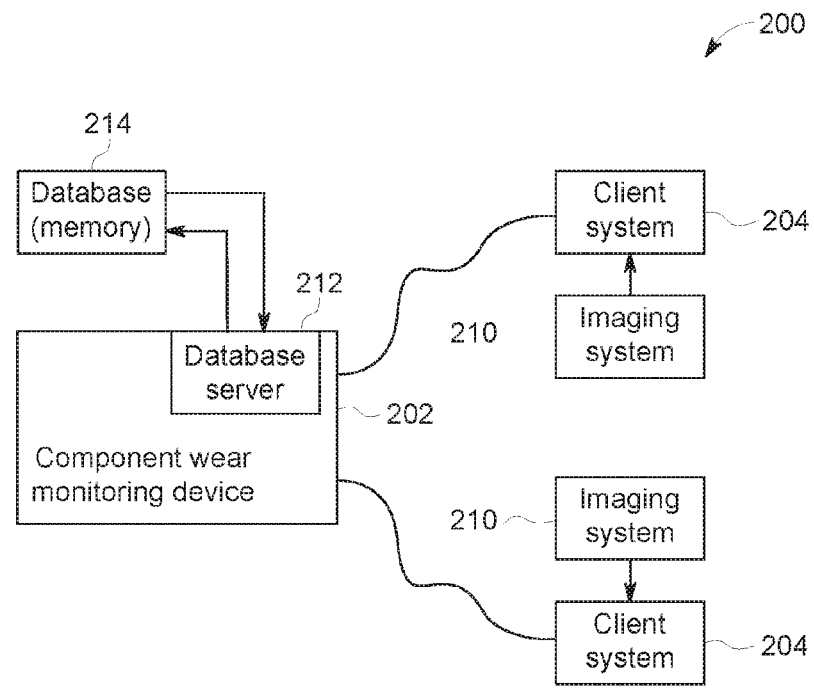
FIG. 3 is a schematic view of an exemplary monitoring system to detect component wear based on computer tomography (CT) generated from a component of a device, such as the gas turbine engine shown in FIG. 1 and the jet turbine engine shown in FIG. 2.

FIG. 3 is a schematic view of an exemplary monitoring system 200 to detect component wear based on computer tomography (CT) scans of a component of a device, such as gas turbine engine 100 (shown in FIG. 1) and jet turbine engine 150 (shown in FIG. 2). In the exemplary embodiment, monitoring system 200 includes a component wear monitoring ("CWM") device 202 configured to receive a component image of a first component being inspected, align the received component image with a stored reference model, detect a plurality of manmade structural features in the received component image, and adjust the component image to mask out at least some of the plurality of manmade structural features from the received component image. CWM device 202 also compares the adjusted component image with the reference model to determine one or more potential defect areas in the first component, analyzes each of the one or more defect areas to determine a state of the potential defect areas, and outputs the state of the one or more potential defect areas to a user.

In some embodiments, CWM device 202 is further configured to generate the reference model by receiving a plurality of component images of a plurality of components. Each of the plurality of components associated with the plurality of component images is substantially defect-free. CWM device 202 is further configured to generate the reference model by aligning the plurality of component images, combining the plurality of component images to generate the reference model, and then storing the reference model.

In some other embodiments, CWM device 202 is further configured to receive a plurality of component images for a plurality of components. Each component of the plurality of components is associated with an asset. CWM device 202 analyzes each component image to determine one or more defect areas associated with each of the plurality of component images. Then CWM device 202 compares the plurality of defect areas to determine one or more trends of component wear and outputs the one or more trends of component wear to the user.

In still other embodiments, CWM device 202 is further configured to store one or more historical trends of component wear in a memory device, compare the adjusted component image with the one or more historical trends of component wear to determine a predicted life of the first component, and output the predicted life of the first component to the user.

CWM device 202 is in communication with one or more client system 204. Client system 204 is in communication with one or more imaging systems 210. In the example embodiment, client systems 204 are computers or computer devices that include a web browser or a software application, which enables client systems 204 to access CWM device 202 using the Internet. More specifically, client systems 204 are communicatively coupled to the Internet through various wired and wireless interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client systems 204 can be any device capable of accessing the Internet including, but not limited to, a desktop computer, a laptop computer, a personal digital assistant (PDA), a cellular phone, a smartphone, a tablet, or other web-based connectable equipment.

Imaging systems 210 provide images of components to associated client system 204. Imaging systems 210 are imaging devices capable of generating a computer tomography (CT) scan, an ultrasound image, a 3D scan, an X-ray image, a video, or any other type of image that allows CWM device 202 to perform the steps as described herein. In some embodiments, imaging systems 210 are stationary, such as physically situated at in-shop inspection locations. In other embodiment, imaging systems 210 are mobile to facilitate using on-site inspection locations. In some embodiments, imaging systems 210 also include a robotic handler (not shown). Imaging systems 210 are in communication with CWM device 202. Imaging systems 210 connect to CWM device 202 through many wired or wireless interfaces including without limitation a network, such as a local area network (LAN) or a wide area network (WAN), dial-in-connections, cable modems, Internet connection, wireless, and special high-speed Integrated Services Digital Network (ISDN) lines.

A database server 212 is coupled to database 214, which contains information on a variety of matters, as described herein in greater detail. In one embodiment, centralized database 214 is stored on CWM device 202. In an alternative embodiment, database 214 is stored remotely from CWM device 202 and may be non-centralized. In some embodiments, database 214 includes a single database having separated sections or partitions or in other embodiments, database 214 includes multiple databases, each being separate from each other. Database 214 stores component images, reference models, historical trends, and analyzed component images.

Figure 4:
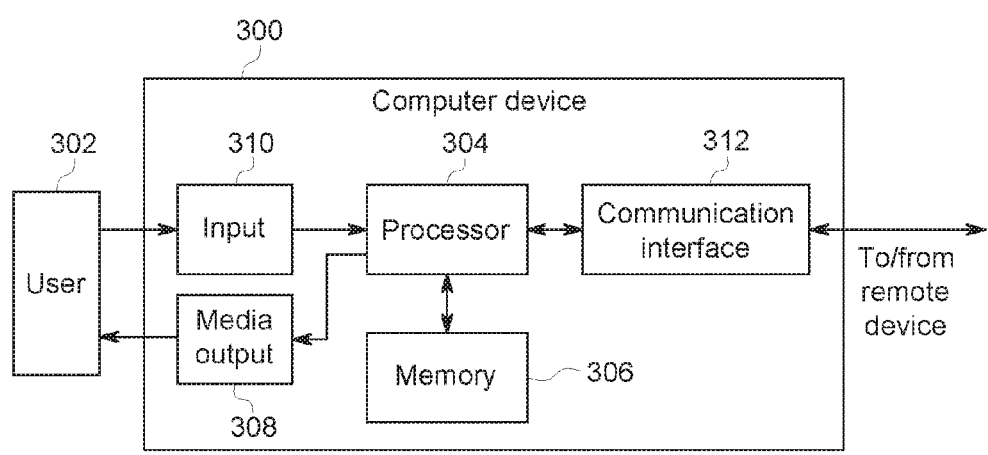
FIG. 4 is a schematic view of an exemplary configuration of a client system that may be used with the monitoring system shown in FIG. 3.

FIG. 4 is a schematic view of an exemplary configuration of a client system 204 that may be used with monitoring system 200 (shown in FIG. 3). Computer device 300 is operated by a user 302. Computer device 300 may include, but is not limited to, client system 204 and imaging system 210 (both shown in FIG. 3). Computer device 300 includes a processor 304 for executing instructions. In some embodiments, executable instructions are stored in a memory area 306. Processor 304 may include one or more processing units (e.g., in a multi-core configuration). Memory area 306 is any device allowing information such as executable instructions and/or transaction data to be stored and retrieved. Memory area 306 includes one or more computer readable media. In some embodiments, memory area 306 includes database 214 (shown in FIG. 3). In some embodiments, memory area 306 is stored in computer device 300. In alternative embodiments, memory area 306 is stored remotely from computer device 300.

Computer device 300 also includes at least one media output component 308 for presenting information to user 302. Media output component 308 is any component capable of conveying information to user 302. In some embodiments, media output component 308 includes an output adapter (not shown) such as a video adapter and/or an audio adapter. An output adapter is operatively coupled to processor 304 and operatively coupled to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 308 is configured to present a graphical user interface (e.g., a web browser and/or a client application) to user 302. In some embodiments, computer device 300 includes an input device 310 for receiving input from user 302. User 302 may use input device 310 to, without limitation, select a measured attribute to view. Input device 310 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 308 and input device 310.

Computer device 300 may also include a communication interface 312, communicatively coupled to a remote device such as imaging system 210 (shown in FIG. 3). Communication interface 312 may include, for example, a wired or wireless network adapter and/or a wireless data transceiver for use with a mobile telecommunications network.

Stored in memory area 306 are, for example, computer readable instructions for providing a user interface to user 302 via media output component 308 and, optionally, receiving and processing input from input device 310. A user interface may include, among other possibilities, a web browser and/or a client application. Web browsers enable users, such as user 302, to display and interact with media and other information typically embedded on a web page or a website from CWM device 202. A client application allows user 302 to interact with, for example, CWM device 202. For example, instructions may be stored by a cloud service, and the output of the execution of the instructions sent to the media output component 308.

Processor 304 executes computer-executable instructions for implementing aspects of the disclosure. In some embodiments, processor 304 is transformed into a special purpose microprocessor by executing computer-executable instructions or by otherwise being programmed. For example, processor 304 is programmed with instructions discussed further below.

Figure 5:
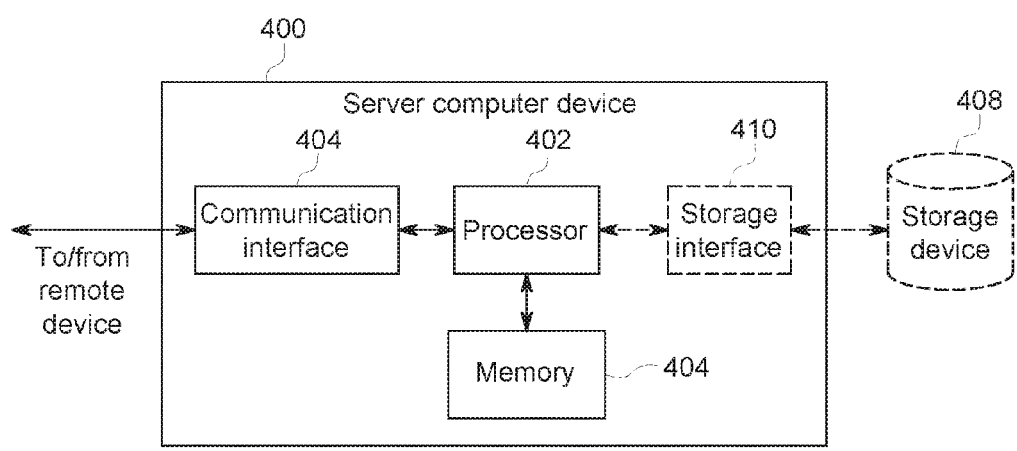
FIG. 5 is a schematic view of an exemplary configuration of a component wear monitoring device that may be used with the monitoring system shown in FIG. 3.

FIG. 5 is a schematic view of an exemplary configuration of CWM device 202 that may be used with monitoring system 200 (both shown in FIG. 3). More specifically, server computer device 400 may include, but is not limited to, CWM device 202 and database server 212 (both shown in FIG. 3). Server computer device 400 also includes a processor 402 for executing instructions. Instructions may be stored in a memory area 404. Processor 402 may include one or more processing units (e.g., in a multi-core configuration).

Processor 402 is operatively coupled to a communication interface 406 such that server computer device 400 is capable of communicating with a remote device, such as another server computer device 400, imaging systems 210 (shown in FIG. 3), CWM device 202 (shown in FIG. 3), or client systems 204 (shown in FIG. 3). For example, communication interface 406 may receive requests from client systems 204, as illustrated in FIG. 3.

Processor 402 is also operatively coupled to a storage device 408. Storage device 408 is any computer-operated hardware suitable for storing and/or retrieving data, such as, but not limited to, data associated with database 214 (shown in FIG. 3). In some embodiments, storage device 408 is integrated in server computer device 400. For example, server computer device 400 may include one or more hard disk drives as storage device 408. In other embodiments, storage device 408 is external to server computer device 400 and is accessed by a plurality of server computer device 400. For example, storage device 408 may include a storage area network (SAN), a network attached storage (NAS) system, and/or multiple storage units such as hard disks and/or solid state disks in a redundant array of inexpensive disks (RAID) configuration.

In some embodiments, processor 402 is operatively coupled to storage device 408 via a storage interface 410. Storage interface 410 is any component capable of providing processor 402 with access to storage device 408. Storage interface 410 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 402 with access to storage device 408.

Processor 402 executes computer-executable instructions for implementing aspects of the disclosure. In some embodiments, processor 402 is transformed into a special purpose microprocessor by executing computer-executable instructions or by otherwise being programmed. For example, processor 402 is programmed with instructions as described further below.

Figure 6:
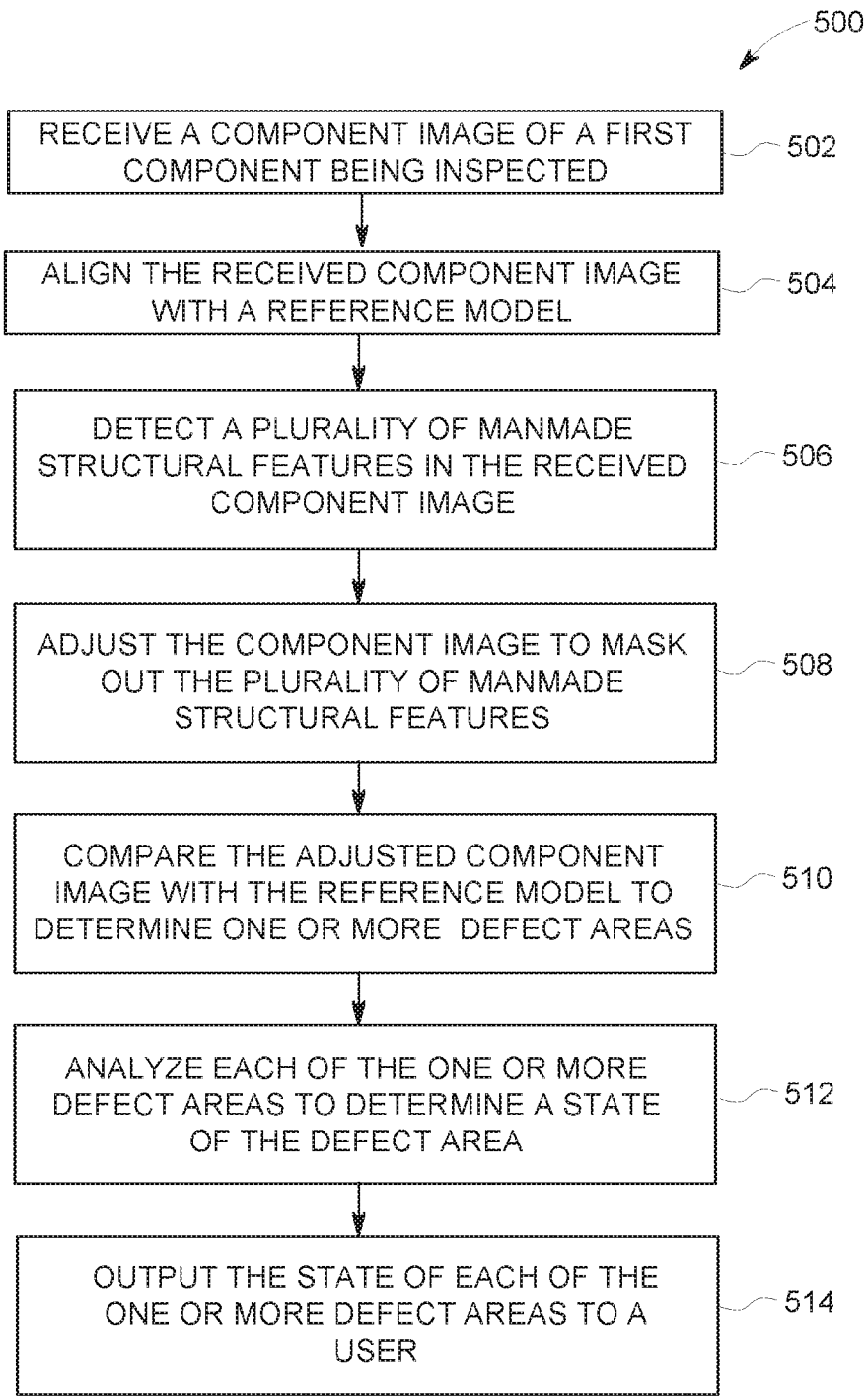
FIG. 6 is a flow chart of an exemplary process of detecting component wear using the monitoring system shown in FIG. 3.

FIG. 6 is a flow chart of an exemplary process 500 of detecting component wear using monitoring system 200 (shown in FIG. 3). In the exemplary embodiment, process 500 is performed by CWM device 202 (shown in FIG. 3).

CWM device 202 receives 502 a component image of a first component to be inspected. In the exemplary embodiment, the component image is a CT scan of a turbine shroud, as discussed above with respect to FIGS. 1 and 2. CWM device 202 aligns 504 the component image of the first component with a reference model. The reference model is a stored model of the component part, i.e., the turbine shroud. The reference model includes multiple normal variations of the component part to help distinguish normal variations from actual defects. In the exemplary embodiment, the reference model is generated by CWM device 202 before being stored in database 214 (shown in FIG. 2). To generate the reference model, CWM device 202 receives a plurality of images of the component part without corrosion, wear, or other defects. CWM device 202 combines the plurality of component images to generate the reference model, also known as a reference template. In another embodiment where corrosion occurs randomly, instead of in patterns, then the component images may include corrosion. With the corrosion being random, CWM device 202 is able to generate the model without corrosion based on comparing the plurality of component images. In some embodiments, CWM device 202 compares test component images to the reference model to train the model for corrosion detection and quantification.

In some embodiments, CWM device 202 uses rigid registration to align 504 the component image with the reference model. For rigid registration, CWM device 202 rotates the component image until it lines up with the reference model. The rotation can be along the x, y, and z axes. In other embodiments, CWM device 202 uses affine transformation to align 504 the component image with the reference model. For affine transformation, CWM device 202 adjusts the position of certain points on the component image to match up with other points on the reference model. In these embodiments, CWM device 202 shifts the points of the component image such that the image is stretched or shrunk, in addition to rotation, to fit to the reference model. In some embodiments where the component is curved, such as a turbine shroud, CWM device 202 represents the observed intensity values in a curved coordinate system (this is equivalent to flattening the curved data) after aligning 504 the component image with the reference model, hence more complex quality metrics can be defined in this curved coordinate system, for example percentage of surface corrosion as a function of distance from the part surface.

CWM device 202 detects 506 a plurality of manmade structural features in the received component image. In the exemplary embodiment, the manmade structural features are cooling holes that have been drilled into the shroud. In other embodiments, examples of manmade structural features could include features from additive manufacturing, features from subtractive manufacturing, and features related to post-processing of the component. In some embodiments, these manmade structural features are created through industrial automation, where the manmade structural features are generated automatically, semi-automatically, or manually. CWM device 202 adjusts 508 the component image to mask out, or otherwise remove, the plurality of manmade structural features from the received component image. These manmade structural features can be misdiagnosed as corrosion. To exclude them from the corrosion reduces the accuracy of the corrosion detection. In some embodiments, the manmade structural features are detected by using eigenvectors of the Hessian Matrix to compute the likeliness of an image region to contain manmade structural features, such as, but not limited to, cooling holes, vessels, or other image ridges. The Hessian Matrix describes the second order logical image intensity variations around a three dimensional (3D) object in an image. Using the eigenvalues, CWM device 202 obtains the eigenvectors and eigenvalues from the Hessian Matrix to determine whether the 3D object is a manmade structure feature. In embodiments where the component image is a subset region, CWM device 202 only masks out the manmade structural features in the subset region.

CWM device 202 compares 510 the adjusted component image with the reference model to determine one or more potential defect areas in the first component. For example, CWM device 202 detects abnormal regions in the component image. These abnormal regions are identified as outliers based on the distribution of normal regions in the reference model. In some embodiments, CWM device 202 uses the parzen-window based statistical model to build a normalcy model. The parzen-window based statistical model is a density estimation method that uses data-interpolation to determine statistical distribution of observations. CWM device 202 uses the normalcy model to determine values for normal areas, i.e., no corrosion. The normalcy model is a baseline that CWM device 202 uses to compare 510 with the adjusted component image to determine areas of potential corrosion and other defects. Based on the normalcy model, CWM device 202 uses statistical analysis to compare the pixels of the component image to the normalcy model to determine which pixels may be corrosion.

In some embodiments, the reference model is divided into regions or segments. In these embodiments, CWM device 202 divides the component image into regions along the same pattern before comparing 510 the adjusted component image and the reference model.

CWM device 202 analyzes 512 each of the one or more defect areas to determine the state of the potential defect area. Many different types of quantitative analysis can be performed on defect areas to evaluate the corrosion and other wear on the component part. In some embodiments, this analysis includes determining corrosion depth, size, and location. CWM device 202 outputs 514 the state of each potential defect area to a user.

Furthermore, by comparing the detected areas from multiple components, one or more common regions or areas may be detected. From these common regions, one or more potential causes of the corrosion may be inferred. Therefore in some embodiments, CWM device 202 repeats steps 502 through 512 for a plurality of components. After analyzing each component, CWM device 202 stores the analysis and the adjust component image. Then CWM device 202 compares the defect areas to determine one or more trends. These trends could lead to causes of corrosion or assist engineers in designing future components. In the situation where the plurality of components is all from the same asset, the comparison may highlight a problem or defect in the asset that is causing the corrosion of the components.

In still other embodiments, CWM device 202 stores one or more historical trends of component wear. These trends may have been determined by CWM device 202 as shown above. CWM device 202 compares the adjusted component image with the one or more historical trends to determine a predicted life of the first component. Based on how components have worn down or corroded in the past, CWM device 202 analyzes the corrosion or wear on the component in the component image. Based on the corrosion or wear on the component, CWM device 202 is able to predict the remaining life in the component. In other embodiments, CWM device 202 is also able to modify a maintenance plan for the component. For example, the user may modify the maintenance plan to increase or decrease the amount of time between inspections. Other potential actions include, but are not limited to, doing nothing, performing other modifications to the maintenance plan, rejecting and replacing the component, and performing inspections of other components of the associated asset.

The above-described method and system provide for enhanced assessment of the wear of components and thus facilitate a more accurate prediction of the lifetime of components. Furthermore, the method and systems described herein allow for an accurate detection of the existence, scope, and location of corrosion and other defects in those components. Also, the system and methods described herein are not limited to any single predefined component, but may be implemented with any component of a device that is subject to wear similar to those described herein. For example, the method and systems described herein may be used with wearable components of aircraft, wind turbines, locomotives, power systems, automobiles, and other devices where components are subject to wear. By accurately analyzing the subsurface defects in components, operating lifetimes and maintenance schedules are more accurately generated.

An exemplary technical effect of the methods, systems, and apparatus described herein includes at least one of: (a) removing manmade structural features from component images to provide more accurate images; (b) analyzing the component image without the manmade structural features to accurately identify and quantify regions of corrosion; (c) comparing the component image to defect free components to accurately determine the extent of defects; (d) compare the determined defects to patterns of wear to determine potential lifetime of the associated component; and (e) compare the defects of a plurality of parts from the same asset to determine potential issues with the asset.

Exemplary embodiments of method and systems for monitoring a dynamic system are described above in detail. The method and systems described herein are not limited to the specific embodiments described herein, but rather, components of systems or steps of the methods may be utilized independently and separately from other components or steps described herein. For example, the methods may also be used in combination with multiple imaging systems, and are not limited to practice with only imaging systems as described herein. Additionally, the methods may also be used with other components of devices, and are not limited to practice with only the components as described herein. Rather, the exemplary embodiments may be implemented and utilized in connection with many other devices that have components with operations lifetimes that need to be replaced over time.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A monitoring system for determining component wear, said monitoring system comprising:
   a memory device configured to store a reference model of a component;
   one or more imaging devices configured to generate images of one or more components of an asset; and
   a component wear monitoring ("CWM") device in communication with said memory device and said one or more imaging devices, said CWM device configured to:
      receive a component image of a first component being inspected from one of said one or more imaging devices;
      detect a plurality of manmade structural features in the received component image;
      adjust the component image to mask out at least some of the plurality of manmade structural features from the received component image;
      compare the adjusted component image with the reference model to determine one or more potential defect areas in the first component;
      analyze each of the one or more defect areas to determine a state of the potential defect areas; and
      output the state of the one or more potential defect areas to a user.

2. The monitoring system in accordance with claim 1, wherein said CWM device is further configured to:
   receive a plurality of component images of a plurality of components, wherein each of the plurality of components associated with the plurality of component images is substantially defect-free;
   align the plurality of component images;
   combine the plurality of component images to generate the reference model; and
   store the reference model in said memory device.

3. The monitoring system in accordance with claim 1, wherein the first component is associated with an asset, and wherein said CWM device is further configured to:
   receive a plurality of component images for a plurality of components from said one or more imaging devices, wherein each component of the plurality of components is associated with the asset;
   analyze each component image to determine one or more defect areas associated with each of the plurality of component images;

compare the plurality of defect areas to determine one or more trends of component wear; and
output the one or more trends of component wear to the user.

4. The monitoring system in accordance with claim 1, wherein said CWM device is further configured to:
store, in said memory device, one or more historical trends of component wear;
compare the adjusted component image with the one or more historical trends of component wear to determine a predicted life of the first component; and
output the predicted life of the first component to the user.

5. The monitoring system in accordance with claim 1, wherein said CWM device is further configured to align the received component image with the reference model using at least one of rigid registration and affine transformation.

6. The monitoring system in accordance with claim 1, wherein said CWM device is further configured to:
flatten the reference model; and
flatten the adjusted component image prior to comparing with the reference model.

7. The monitoring system in accordance with claim 1, wherein the reference model includes a first reference segment and a second reference segment, and wherein said CWM device is further configured to:
segment the component image into a first segment and a second segment;
compare the first segment of the component image with the first reference segment to determine one or more potential defect areas in the first segment; and
compare the second segment of the component image with the second reference segment to determine one or more potential defect areas in the second segment.

8. The monitoring system in accordance with claim 1, wherein said CWM device is further configured to analyze each of the one or more defect areas by statistically comparing pixels from the component image with pixels from the reference model for variations.

9. The monitoring system in accordance with claim 1, wherein the defect areas include areas of corrosion, and wherein the said CWM device is further configured to determine the depth, size, and location of each defect area.

10. The monitoring system in accordance with claim 1, wherein the manmade structure features are cooling holes.

11. The monitoring system in accordance with claim 1, wherein the component image is a Computed Tomography (CT) scan.

12. The monitoring system in accordance with claim 1, wherein the first component is a turbine shroud.

13. A component wear monitoring ("CWM") device comprising a processor and at least one memory device, wherein said processor is in communication with said at least one memory device, said CWM device configured to:
receive a component image of a first component being inspected;
align the received component image with a reference model of a component, wherein the reference model is stored in said at least one memory device;
detect a plurality of manmade structural features in the received component image;
adjust the component image to mask out at least some of the plurality of manmade structural features from the received component image;
compare the adjusted component image with a reference model to determine one or more potential defect areas in the first component, wherein the reference model is stored in said at least one memory device;
analyze each of the one or more defect areas to determine a state of the potential defect areas; and
output the state of the one or more potential defect areas to a user.

14. The CWM device in accordance with claim 13, further configured to:
receive a plurality of component images of a plurality of components, wherein each of the plurality of components associated with the plurality of component images is substantially defect-free;
align the plurality of component images;
combine the plurality of component images to generate the reference model; and
store the reference model in said at least one memory device.

15. The CWM device in accordance with claim 13, wherein the first component is associated with an asset, and wherein said CWM device is further configured to:
receive a plurality of component images for a plurality of components, wherein each component of the plurality of components is associated with the asset;
analyze each component image to determine one or more defect areas associated with each of the plurality of component images;
compare the plurality of defect areas to determine one or more trends of component wear; and
output the one or more trends of component wear to the user.

16. The CWM device in accordance with claim 13, further configured to:
store, in said at least one memory device, one or more historical trends of component wear;
compare the adjusted component image with the one or more historical trends of component wear to determine a predicted life of the first component; and
output the predicted life of the first component to the user.

17. The CWM device in accordance with claim 13, further configured to analyze each of the one or more defect areas by statistically comparing pixels from the component image with pixels from the reference model for variations.

18. The CWM device in accordance with claim 13, wherein the defect areas include areas of corrosion, and wherein said CWM device is further configured to determine the depth, size, and location of each defect area.

19. The method for detecting component wear, said method implemented using a component wear monitoring ("CWM") device including a processor and at least one memory device coupled to said processor, said method comprising:
receiving a component image of a first component being inspected;
detecting a plurality of manmade structural features in the received component image;
adjusting the component image to mask out at least some of the plurality of manmade structural features from the received component image;
comparing the adjusted component image with a reference model to determine one or more potential defect areas in the first component, wherein the reference model is stored in said at least one memory device;
analyzing each of the one or more defect areas to determine a state of the potential defect areas; and
outputting the state of the one or more potential defect areas to a user.

20. The method in accordance with claim 19, further comprising:

receiving a plurality of component images of a plurality of components, wherein each of the plurality of components associated with the plurality of component images is substantially defect-free;

aligning the plurality of component images;

combining the plurality of component images to generate the reference model; and storing the reference model in said at least one memory device.

21. The method in accordance with claim 19, wherein the first component is associated with an asset, and wherein said method further comprises:

receiving a plurality of component images for a plurality of components, wherein each component of the plurality of components is associated with the asset;

analyzing each component image to determine one or more defect areas associated with each of the plurality of component images;

comparing the plurality of defect areas to determine one or more trends of component wear; and outputting the one or more trends of component wear to the user.

22. The method in accordance with claim 19, further comprising:

storing, in the at least one memory device, one or more historical trends of component wear;

comparing the adjusted component image with the one or more historical trends of component wear to determine a predicted life of the first component; and outputting the predicted life of the first component to the user.

23. The method in accordance with claim 19, further comprising analyzing each of the one or more defect areas by statistically comparing pixels from the component image with pixels from the reference model for variations.

24. The method in accordance with claim 19, wherein the defect areas include areas of corrosion, and wherein the said method further comprises determining the depth, size, and location of each defect area.

* * * * *